(12) United States Patent
Doshi et al.

(10) Patent No.: US 8,042,142 B1
(45) Date of Patent: Oct. 18, 2011

(54) STREAMING VIDEO PROCESSING

(75) Inventors: Rushabh A. Doshi, Sunnyvale, CA (US); Wendy Tobagus, Mountain View, CA (US); Vijnan Shastri, Palo Alto, CA (US); Christophe Chaland, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 289 days.

(21) Appl. No.: 12/332,301

(22) Filed: Dec. 10, 2008

(51) Int. Cl.
*H04N 7/173* (2011.01)

(52) U.S. Cl. .......... 725/114; 725/98; 725/105; 725/112; 725/116

(58) Field of Classification Search .............. 725/98, 725/105, 112, 113, 116, 114
See application file for complete search history.

(56) References Cited

U.S. PATENT DOCUMENTS

2008/0003546 A1* 1/2008 Dunbar et al. ................ 434/95
2009/0094590 A1* 4/2009 Mendelson et al. .......... 717/156

* cited by examiner

*Primary Examiner* — Kieu Oanh Bui
(74) *Attorney, Agent, or Firm* — Fenwick & West LLP

(57) ABSTRACT

In one embodiment, a method includes accessing data identifying a video for processing and mapping an instruction graph to the video based on one or more predetermined criteria and the data identifying the video. The instruction graph describes a workflow for processing the video, and the workflow includes a series of services that each provide particular processing of the video. The method includes calling the services in series to process the video based on the instruction graph. The video streams to each service in series as the video processes. A downstream service may begin processing one or more portions of the video after an upstream service has finished processing the one or more portions of the video and before the upstream service has finished processing the video in its entirety.

28 Claims, 3 Drawing Sheets

STREAMING VIDEO PROCESSING

TECHNICAL FIELD

The present disclosure relates generally to processing video.

BACKGROUND

Processing a video typically involves waiting for an uploader to upload the entire video and then running the video through a processing pipeline, with each stage in the processing pipeline finishing its processing of the entire video before the next stage begins. After all the stages in the processing pipeline have finished, the video may be replicated to one or more streaming servers. Until then, the video may be unavailable to the uploader and to users. The more bytes making up the video, the greater the latency or the "time to market" of the video for the uploader and for users.

DESCRIPTION OF EXAMPLE EMBODIMENTS

Figure 1:
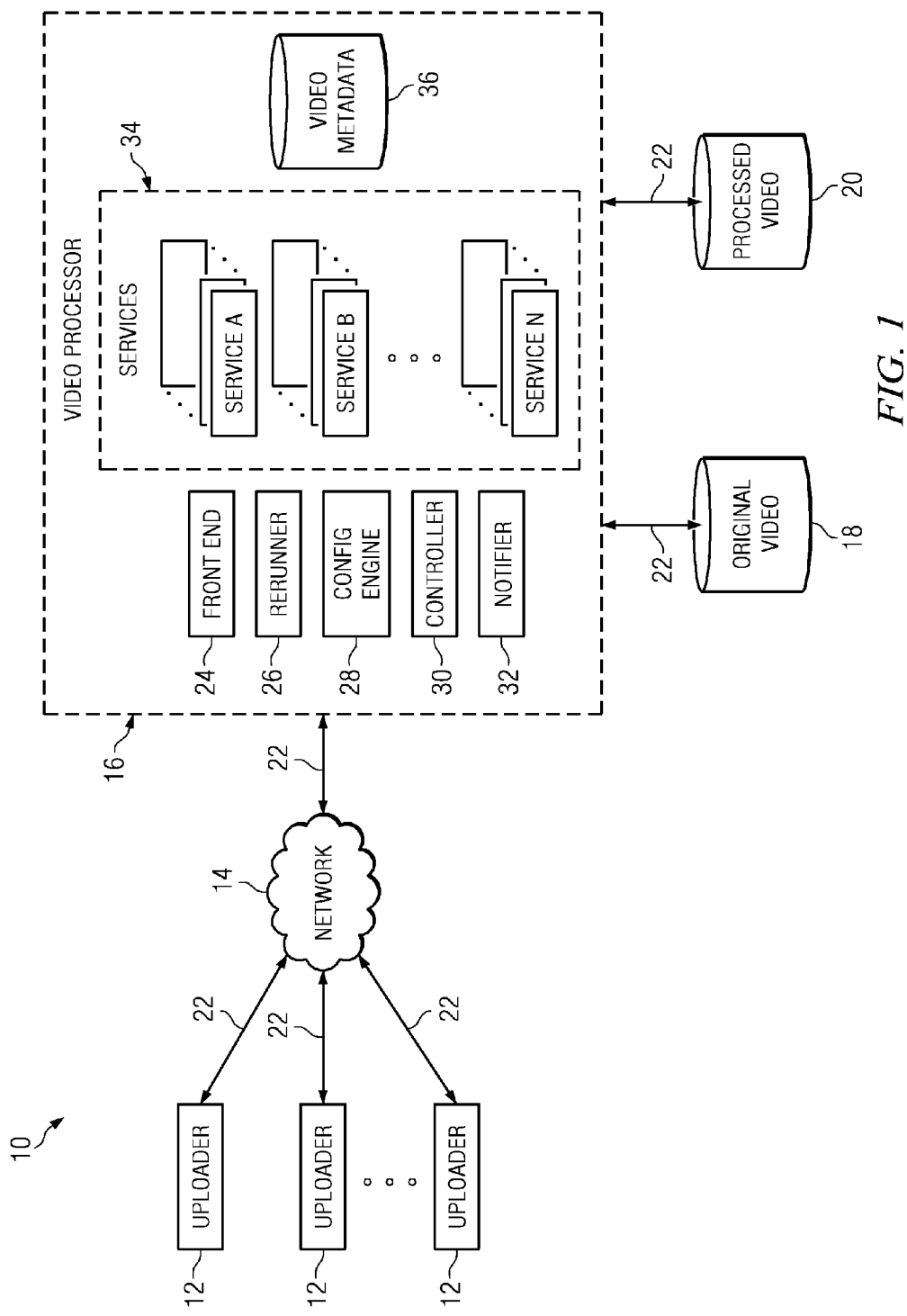
FIG. 1 illustrates an example system for processing video.

FIG. 1 illustrates an example system 10 for processing video. System 10 includes one or more uploaders 12, a network 14, a video processor 16, storage for original video 18, and storage for processed video 20. Uploaders 12 and video processor 16 may communicate with each other via network 14. In particular embodiments, network 14 is an intranet, an extranet, a virtual private network (VPN), a local area network (LAN), a wireless LAN (WLAN), a wide area network (WAN), a metropolitan area network (MAN), a portion of the Internet, or another network 14 or a combination of two or more such networks 14. The present disclosure contemplates any suitable network 14. One or more links 22 couple an uploader 12 or video processor 16 to network 14. In particular embodiments, one or more links 22 each include one or more wireline, wireless, or optical links 22. In particular embodiments, one or more links 22 each include an intranet, an extranet, a VPN, a LAN, a WLAN, a WAN, a MAN, a portion of the Internet, or another link 22 or a combination of two or more such links 22. One or more links 22 couple original video storage 18 or processed video 20 to video processor 16, according to particular needs. The present disclosure contemplates any suitable links 22 coupling uploaders 12 and video processor 16 to network 14 or coupling video processor 16 to original video storage 18 and processed video 20. Links 22 need not be uniform throughout system 10. One or more first links 22 in system 10 may differ from one or more second links 22 in system 10.

In particular embodiments, an uploader 12 is one or more servers or other computer systems that notify video processor 16 when uploader 12 has a video for processing and communicate the video to video processor 16 for processing. Each server or other computer system of uploader 12 may be unitary or distributed, according to particular needs. A distributed server or other computer system may span multiple servers or other computer systems or multiple datacenters, according to particular needs. A particular uploader 12 may initiate the processing of video for one or more particular clients of video processor 16. A client of a video processor 16 may be YOUTUBE.COM, VIDEO.GOOGLE.COM, PICASA.GOOGLE.COM, BLOGGER.COM, or another client or a combination of two or more such clients. These are only example clients, and the present disclosure contemplates any suitable clients or other entities (whether or not specifically identified herein) with video for processing. An uploader 12 may be an intermediate node between video processor 16 and an originator (such as an end user of a client) of video for processing, according to particular needs. In addition or as an alternative, uploader 12 may be an originator (such as an end user of a client) of video for processing, in contact with video processor 16 via network 14.

In particular embodiments, an uploader 12 may communicate a video to video processor 16 by communicating a file containing the video to video processor 16 or by streaming the video to video processor 16. The present disclosure contemplates any suitable files for containing any suitable videos. As an example and not by way of limitation, a file containing a video may be a 3GP file, a GIF file, an ASF file, an AVI file, an MPEG file, an MOV file, a WMV file, or other suitable file. Reference to a video may encompass a file containing a video, and vice versa, where appropriate. In particular embodiments, video streaming is a method of video delivery. As an example and not by way of limitation, a video being streamed to a recipient may be played back or processed at the recipient while the video is being delivered to the recipient or before the video has been delivered in its entirety to the recipient. Reference to a video stream may encompass a video being streamed to a recipient, where appropriate. Example protocols for streaming video in particular embodiments are User Datagram Protocol (UDP), Real-Time Streaming Protocol (RTSP), Real-Time Transport Protocol (RTP), Real-Time Transport Control Protocol (RTCP), and Transmission Control Protocol (TCP). In particular embodiments, a video stream may be unicast, multicast, or peer-to-peer (P2P). In particular embodiments, a video stream may be live or on demand. Reference to a video may encompass a video stream, and vice versa, where appropriate. In particular embodiments, reference to a video stream encompasses any suitable format for communicating the video that enables separate portions of a video to be processed separately, where appropriate.

Video processor 16 processes video from uploaders 12. In particular embodiments, video processor 16 includes software, hardware, or both at one or more servers or other computer systems for processing video, as described below. Components of video processor 16 may be distributed across such servers or other computer systems according to any suitable arrangement. Each server may be a unitary server or distributed server spanning multiple computer systems or multiple datacenters, according to particular needs. In particular embodiments, video processor 16 includes a front end 24, a rerunner 26, a configuration (or config) engine 28, a controller 30, a notifier 32, services 34, and video metadata storage 36. Although the present disclosure describes and illustrates video processor 16 including particular components in a particular arrangement for carrying out particular tasks for carrying out video processing as described below, the present disclosure contemplates video processor 16 including any suitable components in any suitable arrangement for carrying out any suitable tasks for video processing as described below.

In particular embodiments, front end 24 is a hardware, software, or embedded logic component or a combination of two or more such components that provide video processor 16 an interface to uploaders 12. As an example and not by way of limitation, an uploader 12 may notify front end 24 when uploader 12 has a video for video processor 16 to process. In particular embodiments, the notification from uploader 12 is a remote procedure call (RPC). The notification may include a video identifier (VID) of the video. A VID may be a random number and a string identifying a namespace, such as, for example, /youtube/0x123456. The present disclosure contemplates any suitable naming scheme. In addition, the notification may include one or more instructions for video processor 16. Video processor 16 may determine from the VID, the one or more instructions, or a combination of the two what processing to apply to the video. The notification need not supply a complete set of instructions for processing the video. Video processor 16 may determine the complete set of instructions from the VID in the notification, the instructions in the notification, or a combination of the two.

When front end 24 receives a notification from an uploader 12 that uploader 12 has a video for video processor 16 to process, front end 24 may request an instruction graph for the video from config engine 28. The request may include the VID of the video, which config engine 28 may use to determine an instruction graph for the video. In particular embodiments, an instruction graph for a video describes a workflow for processing the video, as described below. In response to the request, config engine 28 may determine the instruction graph and communicate it to front end 24. When front end 24 receives the instruction graph, front end 24 may communicate the VID of the video and the instruction graph to controller 30, which based on the instruction graph may call services 34 to process the video. In particular embodiments, video processor 16 may process a video when the video uploads to video processor 16. In particular embodiments, video processor 16 may wait and process the video after the video has uploaded to video processor 16. As an example and not by way of limitation, video processor 16 may wait for the video to upload in its entirety and for a predetermined event to occur, such as video processor 16 receiving user input instructing video processor 16 to process the video.

In addition to communicating with config engine 28 and controller 30, front end 24 may communicate with video metadata storage 36. Video metadata storage 36 may include one or more database or other systems for storing video metadata. In particular embodiments, video metadata storage 36 stores only video metadata useful for video processing. As an example and not by way of limitation, video metadata storage 36 may store video metadata for a video indicating an uploader 12 of the video, a storage location of the video in original video storage 18, a size of the video in terms of bytes, and a length of the video in terms of time, e.g., hours, minutes, and seconds. The present disclosure contemplates video metadata storage 36 storing any suitable video metadata useful for video processing.

Front end 24 may communicate front-end video metadata for a video to video metadata storage 36 for storage. As an example and not by way of limitation, when front end 24 receives a notification from an uploader 12 that uploader 12 has a video for video processor 16 to process, front end 24 may communicate metadata for the video indicating uploader 12, the size of the video, and the length of the video (which front end 24 may determine from the notification from uploader 12) to video metadata storage 36 for storage. In particular embodiments, front end 24, rerunner 26, config engine 28, controller 30, notifier 32, and services 34 all have access to video metadata storage 36.

Input to and output from video metadata storage 36 may be puts and gets, respectively. Video metadata storage 36 may record a processing history of a video over time. As an example and not by way of limitation, video processor 16 may process a video multiple times, processing the video at different times with different video-processing parameter values (such as processing the video at different times with different transcoders or with different transcoder parameter values). Video metadata storage 36 may record, for each time that video processor 16 processes the video, when video processor 16 processed the video (with a time stamp for example) and the video-processing parameter values used to process the video. The processing history of the video may be useful for debugging. In addition, the processing history may facilitate reprocessing of the video for a client of video processor 16. The processing history of a video may help to avoid conflating data from one processing run of the video with data from another.

In particular embodiments, config engine 28 is a hardware, software, or embedded logic component or a combination of two or more such components that determine instruction graphs for videos. As an example and not by way of limitation, config engine 28 may receive from front end 24 a request for an instruction graph for a video. The instruction graph may describe a workflow for processing the video, as described below. The request may include the VID of the video, which config engine 28 may use to determine an instruction graph for the video. In addition, the request may include one or more instructions for config engine 28, which config engine 28 may use, in addition to the VID of the video, to determine the instruction graph. In addition or as an alternative, the request may include a string identifier (ID) for an instruction graph. Config engine 28 may return an instruction graph corresponding to the string ID in the request. As an example and not by way of limitation, a string ID may be "youtube-normal," which may correspond to an instruction graph that describes a workflow for processing video that includes (in the following order) copying the video, applying first particular transcoding to the video, applying second particular transcoding to the video, applying third particular transcoding to the video, generating "thumbnails" for the video, and applying to the video an algorithm for detecting pornography. When config engine 28 receives the string ID "youtube-normal" for a video, config engine 28 may return to front end 24 the instruction graph corresponding to "youtube-normal" for processing the video.

Config engine 28 may include or otherwise have access to multiple instruction graphs. Each of the instruction graphs may describe a particular workflow for processing particular videos having one or more particular properties. As an example and not by way of limitation, a first instruction graph may describe a first workflow for processing videos from a first client, a second instruction graph may describe a second workflow for processing videos from a second client, and a third instruction graph may describe a third workflow for processing videos from a third client. Config engine 28 may map the video to the first, second, or third workflow based on the VID of the video, which may identify the client requesting processing of the video. Two or more instruction graphs accessible to config engine 28 may describe alternative workflows for processing videos having one or more particular properties. As an example and not by way of limitation, a fourth instruction graph may describe a fourth workflow for processing videos from a fourth client and a fifth instruction graph may describe a fifth workflow for processing videos from the fourth client. The fourth and fifth workflows may apply different transcoders to the video or apply different transcoder parameter values to transcoding of the video by the same transcoder. Config engine 28 may map a video to the fourth workflow or the fifth workflow based on a VID of the video or a string ID for the video, along with one or more predetermined criteria. As a more specific example and not by way of limitation, when config engine 28 receives the string ID "youtube-normal" for a video, based on one or more of the predetermined criteria, there may be an approximately 0.5 probability that config engine 28 will return the fourth workflow for processing the video and an approximately 0.5 probability that config engine 28 will return the fifth workflow for processing the video. As a result, config engine 28 may map approximately 50% of videos from the client YOUTUBE.COM to the fourth workflow and approximately 50% of videos from the client YOUTUBE.COM to the fifth workflow. In particular embodiments, config engine 28 is highly configurable, facilitating the ready modification of the mapping of instruction graphs to videos for processing and to the workflows described by the instruction graphs.

When config engine 28 returns to front end 24 an instruction graph for processing a video, front end 24 may communicate to controller 30 the instruction graph, along with the VID of the video. In addition, front end 24 may communicate to controller 30 a key or other locator for video metadata for the video in video metadata storage 36. In particular embodiments, controller 30 is a hardware, software, or embedded logic component or a combination of two or more such components that control the processing of a video based on an instruction graph from config engine 28. As an example and not by way of limitation, as described above, controller 30 may receive from config engine 28 a VID of a video and an instruction graph for processing the video. Based on the VID, controller 30 may identify an uploader 12 that will stream or otherwise communicate the video to video processor 16 for processing. Based on the instruction graph, controller 30 may identify services 34 that will process the video, the parameter values that services 34 will apply to their respective processing of the video, and the order that services 34 will process the video in. Controller 30 may then call a first service 34 (which, as described below, may be a copier) to process the video. Calling first service 34 may cause first service 34 to generate an instance of itself specifically for the video. Reference to a service 34 may encompass an instance of service 34, and vice versa, where appropriate. Similarly, reference to a task may encompass an instance of a service 34, and vice versa, where appropriate.

When controller 30 calls first service 34, controller 30 may specify one or more parameter values for first service 34 to apply to its processing of the video. In addition, controller 30 may specify where first service 34 may pull the video from. Because first service 34 is the first one of services 34 in the workflow, first service 34 may pull the video from an uploader 12. As an example and not by way of limitation, first service 34 may request the video from uploader 12 and, in response, uploader 12 may stream or otherwise communicate the video to first service 34. First service 34 may process the video as it receives the video. When first service 34 has processed enough of the video for a second service 34 in the workflow to start processing the video, first service 34 may notify controller 30. In response to the notification, controller 30 may call second service 34 to process the video. Calling second service 34 may cause second service 34 to generate an instance of itself specifically for the video. When controller 30 calls second service 34, controller 30 may specify one or more parameter values for second service 34 to apply to its processing of the video. In addition, controller 30 may specify where second service 34 may pull the video from. Because second service 34 directly follows first service 34 in the workflow, second service 34 may pull the video from first service 34. Second service 34 may request first service 34 to start streaming the video to second service 34, and, in response, first service 34 may start streaming the video to second service 34, communicating portions of the video to second service 34 as first service 34 completes its processing of those portions of the video. First service 34 need not complete processing the video in its entirety before streaming the video to second service 34 for processing by second service 34.

When second service 34 has processed enough of the video for a third service 34 in the workflow to start processing the video, second service 34 may notify controller 30. In response to the notification, controller 30 may call third service 34 to process the video. Calling third service 34 may cause third service 34 to generate an instance of itself specifically for the video. When controller 30 calls third service 34, controller 30 may specify one or more parameter values for third service 34 to apply to its processing of the video. In addition, controller 30 may specify where third service 34 may pull the video from. Because third service 34 directly follows second service 34 in the workflow, third service 34 may pull the video from second service 34. Third service 34 may request second service 34 to start streaming the video to third service 34 and, in response, second service 34 may start streaming the video to third service 34, communicating portions of the video to third service 34 as second service 34 completes its processing of those portions of the video. Second service 34 need not complete processing the video in its entirety before streaming the video to third service 34 for processing by third service 34. Moreover, first service 34 need not complete processing the video in its entirety before second service 34 starts streaming the video to third service 34 for processing by third service 34. This process of controller 30 calling services 34 based on the instruction graph and services 34 notifying controller when they have processed enough of the video for downstream processing may continue until the workflow is complete. As the processing of the video completes, video processor 16 may store the video as processed in processed video storage 20.

In particular embodiments, notifier 32 is a hardware, software, or embedded logic component or a combination of two or more such components that notify clients of video processor 16 when events of interest to the clients occur during the processing of their videos. As an example and not by way of limitation, a workflow for processing a video may include a service 34 that generates thumbnails (which may be JPEG or other suitable images) from the video. When service 34 has generated one or more thumbnails from one or more portions of the video, service 34 may notify controller 30. In response, controller 30 may (in addition to calling a next service 34, if there is one, in the workflow to process the video) instruct notifier 32 to generate a message indicating that one or more thumbnails from the video are ready for viewing. Notifier 32 may then generate the message and publish it to one or more clients that have subscribed to receive the notification. As another example, when video processor 16 has completed the processing of one or more portions of a video and those portions are ready for streaming from processed video storage 20 to one or more clients or users, controller 30 may instruct notifier 32 to generate a message indicating that the video is ready for streaming. Notifier 32 may then generate the message and publish it to one or more clients that have subscribed to receive the notification. As another example, if there is an error or failure in the processing of a video, controller 30 may instruct notifier 32 to generate a message indicating that the error or failure has occurred. Notifier 32 may then generate the message and publish it to one or more clients that have subscribed to the receive the notification. In particular embodiments, notifier 32 is a fault-tolerant message queue. Although the present disclosure describes and illustrates notifier 32 as an object of a different class from services 34, the present disclosure contemplates notifier 32 being an object of any suitable class. As an example and not by way of limitation, notifier 32 may be an object of the same class as services 34, which may facilitate more flexible notification functionality. Notifier 32 may be a service 34. In particular embodiments, controller 30 may call notifier 32 and notifier 32 may send a notification at any suitable point in a workflow described by an instruction graph. Moreover, notifier 32 may send multiple notifications at multiples points in the workflow, according to particular needs.

Services 34 may each include a hardware, software, or embedded logic component or a combination of two or more such components that carry out particular processing on one or more videos. As an example and not by way of limitation, a service 34 may be a copier that may generate and archive a copy of a video in its original format (before any further processing) in original video storage 18. The copier may receive a video stream and generate two copies of the video stream. The copier may communicate one of the copies to original video storage 18 for permanent storage and locally hold the other copy for streaming to another service 34 downstream from the copier. As another example, a service 34 may be a transcoder that may transcode a video from one format to another, such as FLASH VIDEO with 320×240 pixels (FLV320). Services 34 may include multiple transcoders. As another example, a service 34 may be a indexer that may index a transcoded video to facilitate streaming the video as transcoded. As another example, a service 34 may be a pornography or other detector that may use one or more algorithms to detect the presence of pornography or other content in a video. As another example, a service 34 may carry out shot analysis, thumbnailing, or fingerprinting. The present disclosure contemplates any suitable services 34 carrying out any suitable processing of any suitable videos. In particular embodiments, video processor 16 uses particular services 34 to process particular videos having particular properties, such as, for example, videos from one or more particular uploaders 12 or clients. In particular embodiments, each service 34 may be developed and deployed independent of other services 34, which may facilitate partial canarying and experimentation with video processing. In particular embodiments, services 34 may be developed and deployed independent of other components of video processor 16, such as controller 30, which may also facilitate partial canarying and experimentation with video processing.

In particular embodiments, a first service 34 in a workflow is downstream from a second service 34 in the workflow if first service 34 comes after second service 34 in the workflow. First service 34 is immediately downstream from second service 34 in the workflow if first service 34 comes directly after second service 34 in the workflow. In particular embodiments, a first service 34 in a workflow is upstream from a second service 34 in the workflow if first service 34 comes before second service 34 in the workflow. First service 34 is immediately upstream from second service 34 in the workflow if first service 34 comes directly before second service 34 in the workflow.

As described above, a video may stream from an upstream service 34 in a workflow for processing the video to an immediately downstream service 34 in the workflow. When upstream service 34 has processed enough of the video for immediately downstream service 34 to start processing the video, upstream service 34 may start streaming the video to immediately downstream service 34, communicating portions of the video to immediately downstream service 34 as upstream service 34 completes its processing of those portions of the video. In particular embodiments, one or more portions of a video ready for streaming from an upstream service 34 to an immediately downstream service 34 may be temporarily stored until requested by immediately downstream service 34. One or more local buffers at upstream service 34 may provide this storage. As an alternative, one or more buffers remote to upstream service 34 may provide this storage. These remote buffers may be dedicated or shared. When immediately downstream service 34 requests the video, the video may stream to immediately downstream service 34 from one or more of the local or remote buffers, according to particular needs. In particular embodiments, in addition to facilitating streaming, this buffering helps to protect against failures. If a service 34 fails, it may be necessary to restart its processing, which may invalidate downstream processing, whether completed or underway. As a result, it may be necessary to restart the downstream "dependent" processing as well. Buffering the video as it streams from upstream services 34 to downstream services 34 in the workflow may speed up these restarts. In particular embodiments, one or more first services 34 may require only one pass to complete their respective processing of a video and one or more second services 34 may require multiple passes to complete their respective processing of a video. In contrast to such first services 34, such second services 34 may require completion of all upstream processing before they may start their respective processing of the video and may be unable to process the video as a stream. To accommodate such second services 34, a workflow that includes one or more such first services 34 and one or more such second services 34 may put such second services 34 downstream from such first services 34, according to particular needs.

In particular embodiments, rerunner 26 is a hardware, software, or embedded logic component or a combination of two or more such components that provide a front end specifically for reprocessing (as opposed to originally processing) videos. As an example and not by way of limitation, an administrator or a user of video processor 16 may initiate the reprocessing of a video and, in response, rerunner 26 may facilitate communication between config engine 28 and controller 30, as described above with respect to front end 24. Because video processor 16 is reprocessing the video, a first service 34 in the workflow for reprocessing the video may pull the video from original video storage 18 (instead of an uploader 12) and the workflow need not generate and archive a copy of the video in its original format (before any further processing) in original video storage 18. In particular embodiments, multiple video processors 16 reside at multiple datacenters, each with its own original video storage 18 and video metadata storage 36. An administrator or a user of a first video processor 16 at a first datacenter may want to reprocess a video that a second video processor 16 at a second datacenter originally processed. Because second video processor 16 at the second datacenter originally processed the video, original video storage 18 and video metadata storage 36 at the second datacenter may contain the original video and the video metadata for the video. The administrator or the user of first video processor 16 may initiate reprocessing of the video and, in response, rerunner 26 in first video processor 16 may identify second video processor 16 as having originally processed the video and the second datacenter as containing the original video and the video metadata for the video. Rerunner 26 in first video processor may then communicate with a config engine 28 and a controller 30 in second video processor 16 at the second datacenter to reprocess the video. In particular embodiments, videos may be reprocessed in batches spanning multiple video processors 16 at multiple datacenters. The present disclosure contemplates any suitable reprocessing of any suitable videos. Herein, reference to reprocessing may encompass processing, and vice versa, where appropriate.

Figure 2:
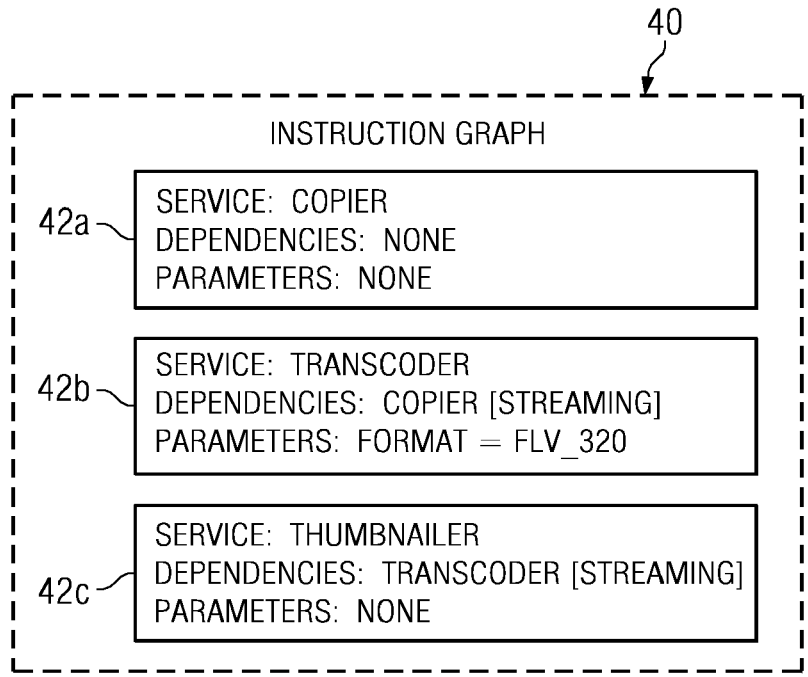
FIG. 2 illustrates an example conceptualization of an example instruction graph.

An instruction graph 40 may be tangible computer-readable instructions describing a workflow for processing a video. FIG. 2 illustrates an example conceptualization of an example instruction graph 40 describing an example workflow for processing a video. Instruction graph 40 may include service descriptions 42. Each service description 42 may identify a service 34 and specify its dependencies and its parameter values for the workflow described by instruction graph 40. As an example and not by way of limitation, an instruction graph 40 describing a workflow may include three services descriptions 42. Service description 42a may identify a copier and specify that the copier has no dependencies. Because the copier has no dependencies in the workflow, the copier may be a first service 34 in the workflow. The parameter values of the processing carried out by the copier may be inherent to the copier, and as a result service description 42a may specify no parameter values for the copier. Service description 42b may identify a transcoder and specify that the transcoder has the copier identified by service description 42a as a dependency. Because the transcoder has the copier as a dependency in the workflow, the transcoder may be a second service 34 (immediately downstream from the copier) in the workflow. Service description 42b may specify the parameter value "FORMAT=FLV_320" for the transcoder, which may instruct the transcoder to transcode the video to a FLASH VIDEO format with 320×240 pixels. Service description 42c may identify a thumbnailer and specify that the thumbnailer has the transcoder identified by service description 42b as a dependency. Because the thumbnailer has the transcoder as a dependency in the workflow, the thumbnailer may be a third service 34 (immediately downstream from the transcoder) in the workflow. The parameter values of the processing carried out by the thumbnailer may be inherent to the thumbnailer, and as a result service description 42v may specify no parameter values for the thumbnailer.

In particular embodiments, one or more portions of an instruction graph 40 (and the workflow it describes) may be nonlinear. A nonlinear workflow may include one or more services 34 that each have multiple dependencies. As an example and not by way of limitation, a workflow for processing a video may include a first service 34 that detects pornography in the video, a second service 34 that detects copyrighted material in the video, and a third service 34 that applies one or more video policies to the video (such as preventing the video from becoming available for streaming to users if the video contains pornography or copyrighted material). Third service 34 may depend on the results of both first and second services 34 to carry out its respective processing, e.g., to decide whether to prevent the video from becoming available for streaming to users. Similarly, a nonlinear workflow may split at one or more points into two or more services 34 that may run substantially parallel to each other. As an example and not by way of limitation, a workflow for processing a video may stream substantially simultaneously to two or more transcoders (one may be an FLV320 transcoder and another may be an FLV640 transcoder for example) that may transcode the video in parallel. The present disclosure contemplates any suitable instruction graph 40 describing any suitable workflow for any suitable processing of any suitable video.

Figure 3:
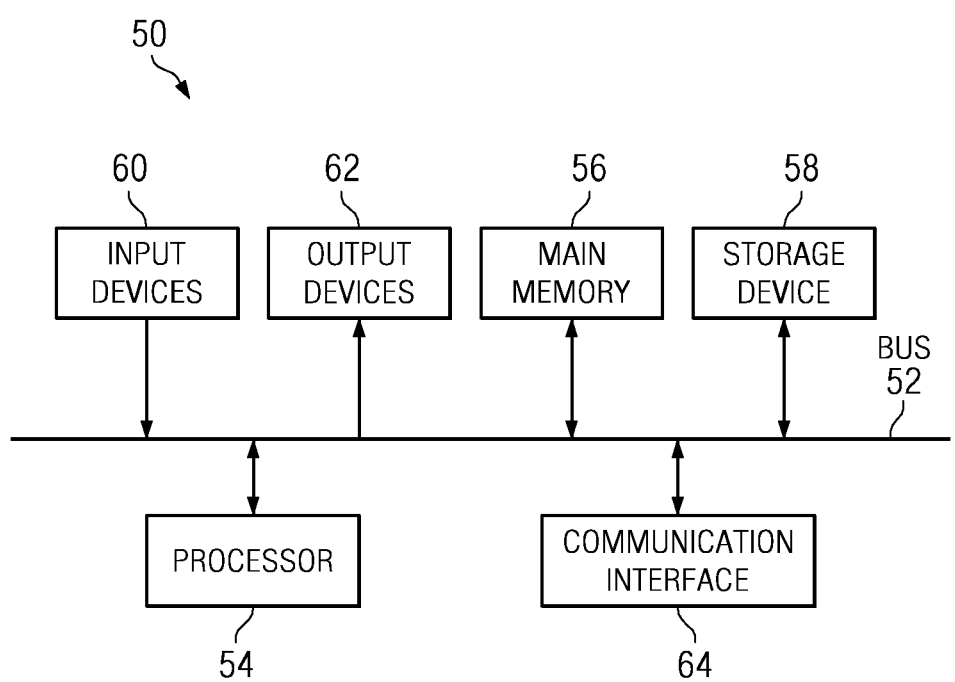
FIG. 3 illustrates an example architecture of an example computer system.

FIG. 3 illustrates an example architecture 50 of an example computer system. In particular embodiments, as described above, video processor 16 may include software, hardware, or both at one or more servers or other computer systems for processing video. Components of video processor 16 may be distributed across such servers or other computer systems according to any suitable arrangement. Each server may be a unitary server or distributed server spanning multiple computer systems or multiple datacenters, according to particular needs. Although FIG. 2 illustrates a particular architecture 40 for a particular computer system, the present disclosure contemplates any suitable architecture for any suitable computer system. Architecture 40 may include one or more buses 52, one or more processors 54, main memory 56, a mass storage device 58, one or more input devices 60, one or more output devices 62, and one or more communication interfaces 64. Bus 52 may include one or more conductors (such as for example copper traces in a printed circuit board (PCB)) providing electrical paths between or among components of the computer system enabling the components to communicate with each other. In addition or as an alternative, bus 52 may include one or more fibers providing optical paths between or among components of the computer system enabling the components to communication with each other. A motherboard and one or more daughterboards may provide one or more portions of bus 52. One or more peripheral buses for expansions to the motherboard or the daughterboards may provide one or more other portions of bus 52. The present disclosure encompasses any suitable bus 52.

Processor 54 may include any suitable processor or microprocessor for interpreting and executing instructions. As an example and not by way of limitation, processor 54 may include an integrated circuit (IC) containing a central processing unit (CPU) with one or more processing cores. Main memory 56 may include volatile or other memory directly accessible to processor 54 for storing instructions or data that processor 54 is currently executing or using. As an example and not by way of limitation, main memory 56 may include one or more ICs containing random access memory (RAM), such as dynamic RAM (DRAM) or static RAM (SRAM). Mass storage device 58 may include persistent memory for storing instructions or data for execution or use by processor 54. As an example and not by way of limitation, mass storage device 58 may include one or more hard disk drives (HDDs) for storing firmware, an operating system (OS), and software for applications that the OS may host for the computer system. Example applications that may run at the computer system include a web browser or a sniffer, which may analyze data packets received by the computer system. One or more of the HDDs may be magnetic or optical, according to particular needs. Mass storage device 58 may include one or more drives for removable optical or magnetic discs, such as compact disc read-only memory (CD-ROM).

Input devices 60 may include one or more devices enabling a user to provide input to the computer system. Example input devices 60 include a keyboard and a mouse. The present disclosure contemplates any suitable combination of any suitable input devices 60. Output devices 62 may include one or more devices for providing output to a user. Example output devices include a monitor, speakers, and a printer. The present disclosure contemplates any suitable combination of any suitable output devices 62. Communication interface 64 may include one or more components enabling the computer system to communicate with other computer systems. As an example and not by way of limitation, communication interface 64 may include one or more components for communicating with another computer system via network 14 or one or more links 22.

As an example and not by way of limitation, the computer system having architecture 40 may provide functionality as a result of processor 54 executing software embodied in one or more tangible, computer-readable media, such as main memory 56. A computer-readable medium may include one or more memory devices, according to particular needs. Main memory 56 may read the software from one or more other computer-readable media, such as mass storage device 58 or from one or more other sources via communication interface 64. The software may cause processor 54 to execute particular processes or particular steps of particular processes described herein. In addition or as an alternative, the computer system may provide functionality as a result of logic hardwired or otherwise embodied in a circuit, which may operate in place of or together with software to execute particular processes or particular steps of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

Figure 4:
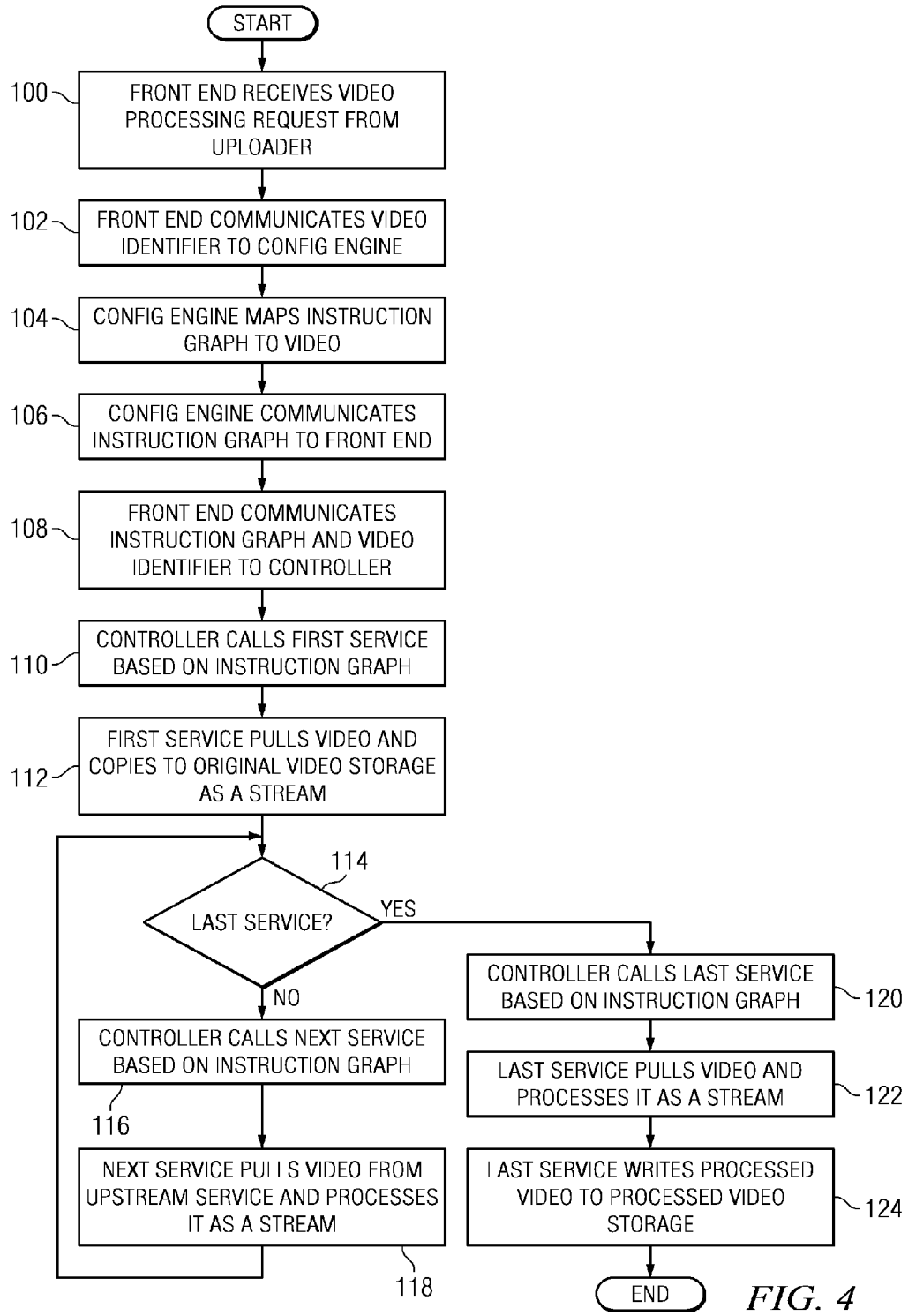
FIG. 4 illustrates an example method for processing video.

FIG. 4 illustrates an example method for processing video. The method starts at step 100, where front end 24 receives from an uploader 12 a request for video processing. As described above, the request may include a VID of the video. At step 102, front end 24 communicates the VID for the video to config engine 28, requesting an instruction graph for the video. At step 104, config engine 28 maps an instruction graph to the video based at least in part on the VID of the video. At step 106, config engine 28 communicates the instruction graph to front end 24. At step 108, front end 24 communicates the instruction graph and VID to controller 30. At step 110, controller 30 calls a first service 34 in the workflow based on instruction graph. As described above, the call may specify where first service 34 may pull the video from. At step 112, first service 34 pulls the video and copies it to original video storage 18. First service 34 may pull the video from uploader 12 and process it as a stream, as described above. At step 114, if a next service 34 in the workflow is not a last service 34 in the workflow, the method proceeds to step 116. At step 116, controller 30 calls a next service 34 in the workflow based on the instruction graph. As described above, the call may specify where next service 34 may pull the video from. At step 118, next service 34 pulls the video and processes it as a stream. Returning to step 114, if a next service 34 in the workflow is a last service 34 in the workflow, the method proceeds to step 120. At step 120, controller 30 calls last service 34 based on the instruction graph 34. As described above, the call may specify where next service 34 may pull the video from. At step 122, last service 34 pulls the video and processes it as a stream. At step 124, last service 34 writes the processed video to processed video storage 20, at which point the method ends. Although the present disclosure describes and illustrates particular components carrying out particular steps of the method of FIG. 4, the present disclosure contemplates any suitable components carrying out any suitable steps of the method of FIG. 4. Moreover, although the present disclosure describes and illustrates particular steps of the method of FIG. 4 occurring in a particular order, the present disclosure contemplates any suitable steps of the method of FIG. 4 occurring in any suitable order.

The present disclosure encompasses all changes, substitutions, variations, alterations, and modifications to the example embodiments described herein that a person having ordinary skill in the art would comprehend. Similarly, where appropriate, the appended claims encompass all changes, substitutions, variations, alterations, and modifications to the example embodiments described herein that a person having ordinary skill in the art would comprehend.

We claim:

1. A method for processing a streaming video, comprising:
   receiving a request for processing a video, the request comprising an identification identifying the video for processing;
   determining an instruction graph for the video based on one or more predetermined criteria and the identification of the video, the instruction graph describing a workflow for processing the video, the workflow comprising a plurality of services for processing of the video; and
   executing the plurality of the services to process the video based on the instruction graph, comprising:
      responsive to a first service finishing processing one or more portions of the video, streaming the one or more portions of the video to a second service;
      simultaneously processing the video by the first service and the second service, wherein the first service continues processing one or more unprocessed portions of the video and the second service processes the one or more portions of the video streamed from the first service.

2. The method of claim 1, wherein one or more of the predetermined criteria comprise a first instruction graph for a first percentage of videos from a client and a second instruction graph for a second percentage of videos from the client.

3. The method of claim 1, wherein executing a service of the plurality of services comprises notifying the service that one or more portions of the video are ready for processing by the service and where to pull the one or more portions of the video from.

4. The method of claim 1, wherein executing a service of the plurality of services generates an instance of the service for processing the video.

5. The method of claim 1, wherein the instruction graph comprises a service description for each service, each service description identifying the service, one or more dependencies of the service in the workflow, and a value for a parameter of the service in the workflow.

6. The method of claim 1, wherein one of the services in the workflow is a copier configured to generate a first copy of the video for original storage and a second copy of the video for downstream processing in the workflow.

7. The method of claim 1, wherein:
   the plurality of services in the workflow comprise a copier, a transcoder, and an indexer;
   the copier is a upstream service from the transcoder and the indexer, the transcoder is a downstream service from the copier and a upstream service from the indexer, and the indexer is a downstream service from the transcoder, wherein a upstream service is executed before a downstream service;
   the transcoder is configured to transcode the video from a first format to a second format; and
   the indexer is configured to index frames of the video to facilitate a video player skipping forward or backward during playback of the video.

8. The method of claim 1, wherein the identification identifying the video is a string comprising a video identifier (VID).

9. The method of claim 1, wherein one portion of the video comprise one or more frames of the video.

10. A non-transitory computer-readable medium storing executable computer program code for:
receiving a request for processing a video, the request comprising an identification identifying the video for processing;
determining an instruction graph for the video based on one or more predetermined criteria and the identification of the video, the instruction graph describing a workflow for processing the video, the workflow comprising a plurality of services for processing of the video; and
executing the plurality of the services to process the video based on the instruction graph, comprising:
responsive to a first service finishing processing one or more portions of the video, streaming the one or more portions of the video to a second service;
simultaneously processing the video by the first service and the second service, wherein the first service continues processing one or more unprocessed portions of the video and the second service processes the one or more portions of the video streamed from the first service.

11. The computer-readable medium of claim 10, wherein one or more of the predetermined criteria comprise a first instruction graph for a first percentage of videos from a client and a second instruction graph for a second percentage of videos from the client.

12. The software of claim 10, wherein executing a service of the plurality of services comprises notifying the service that one or more portions of the video are ready for processing by the service and where to pull the one or more portions of the video from.

13. The computer-readable medium of claim 10, wherein calling a service of the plurality of services generates an instance of the service for processing the video.

14. The computer-readable medium of claim 10, wherein the instruction graph comprises a service description for each service, each service description identifying the service, one or more dependencies of the service in the workflow, and a value for a parameter of the service in the workflow.

15. The computer-readable medium of claim 10, wherein one of the services in the workflow is a copier configured to generate a first copy of the video for original storage and a second copy of the video for downstream processing in the workflow.

16. The computer-readable medium of claim 10, wherein:
the plurality of services in the workflow comprise a copier, a transcoder, and an indexer;
the copier is a upstream service from the transcoder and the indexer, the transcoder is a downstream service from the copier and a upstream service from the indexer, and the indexer is a downstream service from the transcoder, wherein a upstream service is executed before a downstream service;
the transcoder is configured to transcode the video from a first format to a second format; and
the indexer is configured to index frames of the video to facilitate a video player skipping forward or backward during playback of the video.

17. The computer-readable medium of claim 10, wherein the identification identifying the video is a string comprising a video identifier (VID).

18. The computer-readable medium of claim 10, wherein one portion of the video comprise one or more frames of the video.

19. A system for processing a streaming video comprising:
a configuration engine configured to:
receive a request for processing a video, the request comprising an identification identifying the video for processing; and
determine an instruction graph for the video based on one or more predetermined criteria and the identification of the video, the instruction graph describing a workflow for processing the video, the workflow comprising a plurality of services for processing of the video; and
a controller, coupled to the configuration engine, configured to:
execute the plurality of the services to process the video based on the instruction graph, comprising:
responsive to a first service finishing processing one or more portions of the video, stream the one or more portions of the video to a second service;
simultaneously process the video by the first service and the second service, wherein the first service continues processing one or more unprocessed portions of the video and the second service processes the one or more portions of the video streamed from the first service.

20. The system of claim 19, wherein one or more of the predetermined criteria comprise a first instruction graph for a first percentage of videos from a client and a second instruction graph for a second percentage of videos from the client.

21. The system of claim 19, wherein the controller is configured to notify the service that one or more portions of the video are ready for processing by the service and where to pull the one or more portions of the video from.

22. The system of claim 19, wherein the controller is configured to generate an instance of a service for processing the video.

23. The system of claim 19, wherein the instruction graph comprises a service description for each service, each service description identifying the service, one or more dependencies of the service in the workflow, and a value for a parameter of the service in the workflow.

24. The system of claim 19, wherein one of the services in the workflow is a copier configured to generate a first copy of the video for original storage and a second copy of the video for downstream processing in the workflow.

25. The system of claim 19, wherein:
the plurality of services in the workflow comprise a copier, a transcoder, and an indexer;
the copier is a upstream service from the transcoder and the indexer, the transcoder is a downstream service from the copier and upstream from the indexer, and the indexer is a downstream service from the transcoder, a upstream service is executed before a downstream service;
the transcoder is configured to transcode the video from a first format to a second format; and
the indexer is configured to index frames of the video to facilitate a video player skipping forward or backward during playback of the video.

26. The system of claim 19, wherein the identification identifying the video is a string comprising a video identifier (VID).

27. The system of claim 19, wherein one portion of the video comprise one or more frames of the video.

28. A system for processing a streaming video comprising:
means for receiving a request for processing a video, the request comprising an identification identifying the video for processing;

means for determine an instruction graph for the video based on one or more predetermined criteria and the identification of the video, the instruction graph describing a workflow for processing the video, the workflow comprising a plurality of services for processing of the video; and means for executing the plurality of the services to process the video based on the instruction graph, comprising:
responsive to a first service finishing processing one or more portions of the video, streaming the one or more portions of the video to a second service;

simultaneously processing the video by the first service and the second service, wherein the first service continues processing one or more unprocessed portions of the video and the second service processes the one or more portions of the video streamed from the first service.

\* \* \* \* \*